Patented Mar. 31, 1942

2,277,862

UNITED STATES PATENT OFFICE 2,277,862

PROCESS FOR THE PREPARATION OF DIAMIDINE DERIVATIVES

Arthur James Ewins and Harry James Barber, Romford, George Newbery, Hutton Mount, Julius Nicholson Ashley, Upminster, and Alan David Henderson Self, Hornchurch, England, assignors to May & Baker, Limited, London, England, a company of Great Britain and Northern Ireland No Drawing. Original application December 5, 1938, Serial No. 244,032. Divided and this application December 5, 1940, Serial No. 368,612. In Great Britain and Australia December 10, 1937

6 Claims. (Cl. 260—564)

The present invention relates to the preparation of amidine derivatives having trypanocidal properties and the present application is a divisional application out of co-pending application Serial No. 244,032.

It is known that certain substituted derivatives of di- and tri-phenyl methane possess bactericidal properties. It is also known that the replacement of the amino group in a series of diamino-alkanes by amidine groups enhances the therapeutic properties of these compounds. We have found that many amidine substituted derivatives of diaryl alkanes of the type

AmR—(CH₂)n—RAm in which Am represents the amidine residue

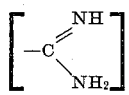

R a phenyl residue, and $n$ a whole number not exceeding twelve, possess trypanocidal and other therapeutically valuable properties. It has also been found that the replacement of one or more CH₂ groups in the alkane chain by a divalent element such as oxygen or sulphur, or a divalent group such as NH, in many cases enhances these properties while amidine derivatives of the directly linked phenyl residue (in which case $n=0$) are also therapeutically active.

The object of the present invention is the manufacture of diamidine derivatives of the type Am.R.O.R.Am in which Am represents the amidine group

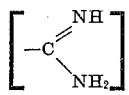

R represents a member of the group consisting of a benzene nucleus and a benzyl group which is united to the oxygen by its side chain.

According to the present invention such compounds are prepared from the corresponding dicyano compounds by treating them in solution in an anhydrous alcohol with dry hydrochloric or hydrobromic acid whereby the cyano groups are converted into imino ether hydrochlorides or hydrobromides

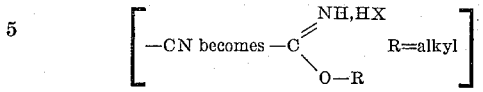

which on treatment with ammonia yields the required amidine.

The following examples illustrate how the invention is carried out in practice, but the invention is in no way limited to the example.

Example 1

10 grams of 4:4'-dicyano-diphenyloxide prepared from the corresponding 4:4'-diamino-diphenyloxide are suspended in 70 cc. of absolute alcohol saturated with dry hydrogen chloride at 0° C. The mixture is kept at 0°–10° C. for 24 hours, the excess hydrogen chloride and alcohol removed by distillation in vacuo and the residual imino-ether hydrochloride together with some unchanged nitrile treated with 150 cc. of alcoholic ammonia in a closed vessel for 1 hour at 60° C. After cooling, the excess alcohol and ammonia are removed under reduced pressure, the residue taken up in water and filtered. On addition of caustic soda solution in slight excess, 4:4'-diamidino-diphenyl-oxide is obtained as a white crystalline solid, melting point 215–216° C.

Example 2

10 grams of 4:4'-dicyan-phenyl-benzyl-ether (prepared from 4-cyano-benzyl-chloride and 4-cyano-phenol by the Ullman method) are suspended in 100 cc. of absolute ethyl alcohol and the mixture saturated with dry hydrogen chloride at 0–5° C. The whole is left for 48 hours at 0–10° C. and the excess of hydrogen chloride and alcohol are then removed in a vacuum. The residual mass (containing the imino ether hydrochloride together with a little unchanged nitrile) is then heated in a closed vessel with 15 cc. of 10% ethyl-alcoholic ammonia for 2 hours at 60° C. The excess alcohol and ammonia are removed on a steam bath and the amidine hydrochloride is extracted from the residue with water. The solution is filtered from unchanged nitrile and 4:4′-diamidino-phenyl-benzyl-ether precipitated by the addition of caustic soda to the filtrate. It separates as a crystalline solid, melting point 224-5° C. (decomp).

*Example 3*

24.8 grams of 4:4′-dicyano-dibenzyl-ether (prepared either by condensation of 4-cyanobenzyl-chloride with 4-cyanobenzyl-alcohol or from dibenzyl-ether 4:4′-dicarboxylic acid by known methods) are dissolved in 50 cc. of dry chloroform and 25 cc. of absolute ethyl alcohol added. The solution is cooled in ice water, and saturated with dry hydrogen chloride. The reaction mixture, contained in a well stoppered vessel, is left for 100 hours in the ice chest, and the solvent and excess hydrogen chloride are then removed at ordinary temperature in a vacuum. The residual mass of dibenzyl ether 4:4′-di-imino ether hydrochloride is heated for 2 hours at 60° C. with a slight excess of dry 10% alcoholic ammonia. The alcohol is then removed and the residual 4:4′-diamidino-dibenzyl-ether hydrochloride dissolved in water and filtered. The pure base crystallises in glistening plates on addition of excess sodium hydroxide solution to the filtrate, melting point 195° C. (decomp).

What we claim and desire to secure by Letters Patent is:

1. Process for the preparation of diamidine derivatives of the type Am.R.O.R.Am in which Am represents the amidine group

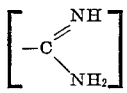

R represents a member of the group consisting of a benzene nucleus and a benzyl group which is united to the oxygen by its side chain, characterised by treating the corresponding dicyano compounds CN.R.O.R.CN in solution in an anhydrous lower aliphatic alcohol with dry hydrohalide acid, being a member of the group consisting of hydrochloric and hydrobromic acid, whereby the cyano groups are converted into imino-ether-hydrohalides

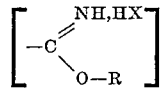

(where X is a member of the halogen series consisting of chlorine and bromine and R is an alkyl group) and treating the compounds so obtained with ammonia to yield the required diamidines.

2. A diamidine derivative of the type

Am.R.O.R.Am in which Am represents the amidine group

R represents a member of the group consisting of a benzene nucleus and a benzyl group which is united to the oxygen by its side chain.

3. 4:4′-diamidino-diphenyl-oxide.
4. 4:4′-diamidino-phenyl-benzyl-ether.
5. 4:4′-diamidino-dibenzyl-ether.

6. A member of the group consisting of the diamidine derivatives of the type Am.R.O.R.Am, and the hydrochloric and hydrobromic acid addition compounds of said diamidine derivatives, in which Am represents the amidine group

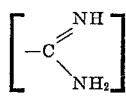

and R represents a member of the group consisting of a benzene nucleus and a benzyl group which is united to the oxygen by its side chain.

ARTHUR JAMES EWINS.
HARRY JAMES BARBER.
GEORGE NEWBERY.
JULIUS NICHOLSON ASHLEY.
ALAN DAVID HENDERSON SELF.